United States Patent
Rickey et al.

(10) Patent No.: US 10,767,866 B2
(45) Date of Patent: Sep. 8, 2020

(54) MICROMIXER FOR USE WITH LIQUID FUEL

(71) Applicant: General Electric Company, Schenectady, NY (US)

(72) Inventors: Owen James Sullivan Rickey, Saratoga Springs, NY (US); Joel Meier Haynes, Schenectady, NY (US); Su Cao, Schenectady, NY (US); Shih-Yang Hsieh, Cohoes, NY (US)

(73) Assignee: General Electric Company, Schenectady, NY (US)

( * ) Notice: Subject to any disclaimer, the term of this patent is extended or adjusted under 35 U.S.C. 154(b) by 153 days.

(21) Appl. No.: 16/032,693

(22) Filed: Jul. 11, 2018

(65) Prior Publication Data
US 2020/0018484 A1    Jan. 16, 2020

(51) Int. Cl.
| | | |
|---|---|---|
| F23R 3/28 | (2006.01) | |
| F23R 3/36 | (2006.01) | |
| F23D 14/64 | (2006.01) | |
| F02C 9/40 | (2006.01) | |
| F23R 3/32 | (2006.01) | |
| F02C 7/22 | (2006.01) | |
| F23R 3/12 | (2006.01) | |

(52) U.S. Cl.
CPC ............. *F23R 3/286* (2013.01); *F02C 7/222* (2013.01); *F02C 9/40* (2013.01); *F23D 14/64* (2013.01); *F23R 3/12* (2013.01); *F23R 3/283* (2013.01); *F23R 3/32* (2013.01); *F23R 3/36* (2013.01); *F05D 2240/128* (2013.01)

(58) Field of Classification Search
CPC .. F23R 3/286; F23R 3/283; F23R 3/12; F23D 14/64; F02C 7/222
See application file for complete search history.

(56) References Cited

U.S. PATENT DOCUMENTS

| | | | |
|---|---|---|---|
| 5,658,358 A * | 8/1997 | Chyou | B01F 5/0473 138/37 |
| 9,074,773 B2 | 7/2015 | Boardman | |
| 9,261,279 B2 | 2/2016 | Westmoreland | |
| 9,366,440 B2 | 6/2016 | Berry | |
| 9,416,975 B2 | 8/2016 | Myers | |
| 2010/0192579 A1 * | 8/2010 | Boardman | F23R 3/286 60/737 |
| 2013/0269351 A1 | 10/2013 | Hu | |
| 2016/0290650 A1 | 10/2016 | Abd El-Nabi | |

* cited by examiner

*Primary Examiner* — Todd E Manahan
*Assistant Examiner* — Thuyhang N Nguyen
(74) *Attorney, Agent, or Firm* — Dority & Manning, P.A.

(57) ABSTRACT

A micromixer of a gas turbine has a plurality of tubes each having an inlet and an outlet for receiving a flow and dispersing the flow to a combustor. At least some of the tubes have a liquid fuel injector, and the liquid fuel injector projects into one of the tubes. The liquid fuel injector has a ramped upstream surface and two converging side surfaces. The ramped upstream surface compresses the flow passing thereover, and a top surface of the liquid fuel injector comprises a liquid fuel outlet.

20 Claims, 8 Drawing Sheets

US 10,767,866 B2

MICROMIXER FOR USE WITH LIQUID FUEL

BACKGROUND OF THE INVENTION

The disclosure relates generally to gas turbines and, more particularly, to a gas turbine operable in a dual fuel mode where a liquid fuel is injected into a multimixer tube.

Rotary machines, such as gas turbines, are often used to generate power for electric generators. Gas turbines, for example, have a gas path which typically includes, in serial-flow relationship, an air intake, a compressor, a combustor, a turbine, and a gas outlet. At least some known turbine engines have high specific work and power per unit mass flow requirements. To increase power output and operating efficiency, at least some known gas turbine engines use a liquid fuel (e.g., liquid hydrocarbons such as gasoline) rather than vapor fuel (e.g., natural gas).

The liquid fuel must be thoroughly mixed with combustion air in order to efficiently combust the liquid fuel. At least some known gas turbines mix natural gas with combustion air in a micromixer. The micromixer includes a tube with a plurality of perforations through which natural gas is introduced into the natural gas stream. The end of the perforations, or the injection points, are generally flush with the wall of the micromixer. The natural gas is able to mix with the combustion air because the natural gas is a vapor. However, liquid fuel introduced through the same perforations may not entrain with the combustion gas because the perforations do not introduce the liquid fuel far enough into the micromixer.

BRIEF DESCRIPTION OF THE INVENTION

In an aspect of the present invention, a micromixer of a gas turbine has a plurality of tubes each having an inlet and an outlet for receiving a flow and dispersing the flow to a combustor. At least some of the tubes have a liquid fuel injector, and the liquid fuel injector projects into one of the tubes. The liquid fuel injector has a ramped upstream surface and two converging side surfaces. The ramped upstream surface compresses the flow passing thereover, and a top surface of the liquid fuel injector comprises a liquid fuel outlet.

In another aspect of the present invention, a gas turbine has a compressor, a combustor, a turbine section and a micromixer. The micromixer has a plurality of tubes each having an inlet and an outlet for receiving a flow and dispersing the flow to the combustor. At least some of the tubes have a liquid fuel injector. The liquid fuel injector projects into one of the tubes. The liquid fuel injector has a ramped upstream surface and two converging side surfaces. The ramped upstream surface compresses the flow passing thereover, and a top surface of the liquid fuel injector comprises a liquid fuel outlet.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
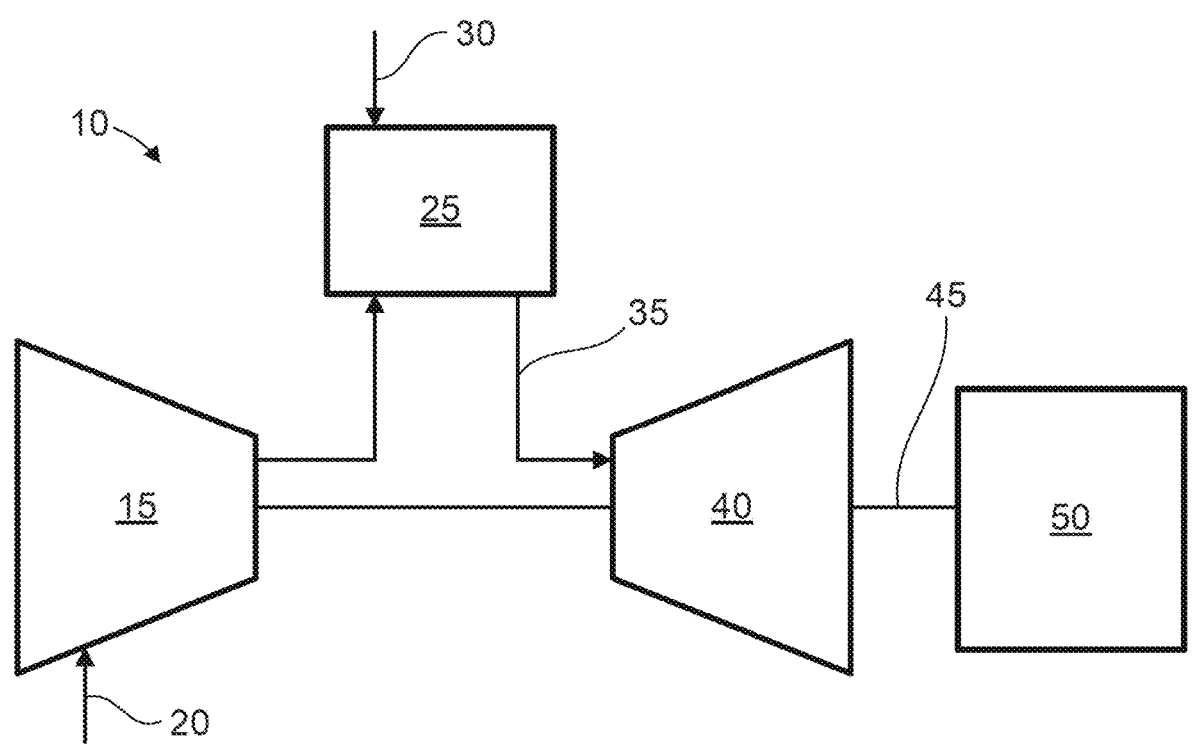
FIG. 1 illustrates a schematic diagram of a gas turbine including a compressor, a combustor, and a turbine.

Referring now to the drawings, in which like numerals refer to like elements throughout the several views. FIG. 1 shows a schematic view of a gas turbine 10 as may be used herein. The gas turbine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine 10 may include any number of combustors 25. The flow of combustion gases 35 is in turn delivered to a turbine 40. The flow of combustion gases 35 drives the turbine 40 so as to produce mechanical work. The mechanical work produced by the turbine 40 drives the compressor 15 via a shaft 45 and an external load 50 such as an electrical generator or the like.

The gas turbine engine 10 may use natural gas, liquid fuels, various types of syngas, and/or other types of fuels and combinations thereof. The gas turbine engine 10 may be one of a number of different gas turbine engines offered by the General Electric Company of Schenectady, N.Y., including, but not limited to, those such as a 7 or a 9 series heavy duty gas turbine and the like. The gas turbine 10 may have different configurations and may use other types of components. Other types of gas turbine engines also may be used herein. Multiple gas turbine engines, other types of turbines, and other types of power generation equipment also may be used herein together.

Figure 2:
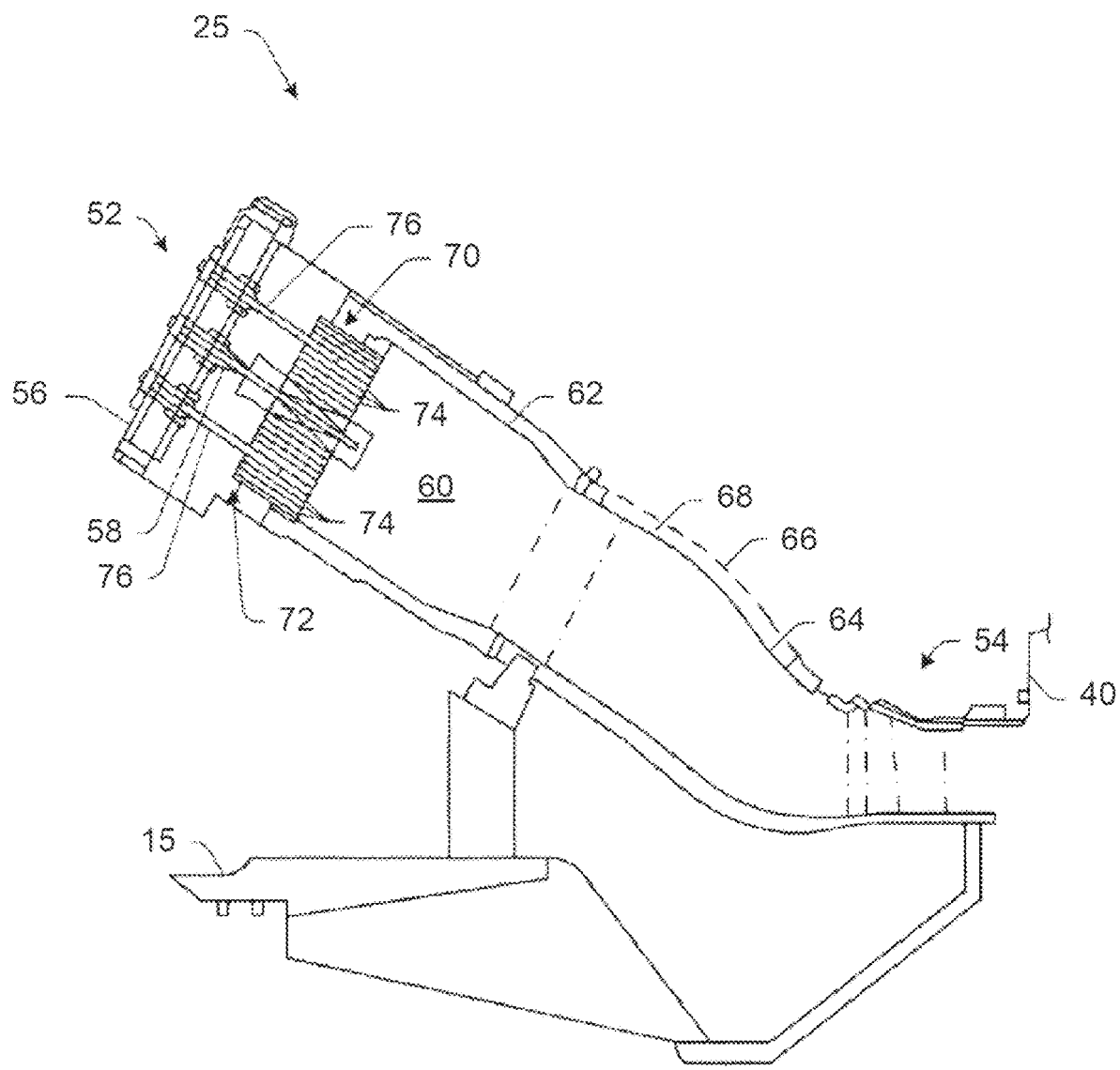
FIG. 2 illustrates a side cross-sectional view of a combustor as may be used in the gas turbine of FIG. 1, the combustor including a primary premixer.

FIG. 2 shows a side cross-sectional view of an example of the combustor 25 as may be used in the gas turbine engine 10 described above and the like. The combustor 25 may extend from an upstream or head end 52 to a downstream or aft end 54 positioned adjacent the turbine 40. The combustor 25 may include an end cover 56 positioned at the head end 52 and a number of fuel nozzles 58 positioned about the end cover 56. Any number of fuel nozzles 58 may be used in any configuration. The fuel nozzles 58 may be in fluid communication with a fuel source (not shown) that generates the flow of fuel 30. As is shown, the fuel nozzles 58 may be attached to the end cover 56 and may extend downstream therefrom to a combustion zone 60 of the combustor 25. The combustor 25 also may include a liner 62 extending from the downstream ends of the fuel nozzles 58 to a transition piece 64 positioned near the aft end 54 of the combustor 25. In this manner, the liner 62 may define the combustion zone 60 therein, and the transition piece 64 may provide fluid communication between the combustion zone 60 and the turbine 40. The liner 62 may be surrounded by a flow sleeve 66, such that a flow path 68 is defined therebetween for receiving a flow of air, such as the compressed flow of air 20 from the compressor 15, therethrough.

The combustor 25 further may include a primary premixer, such as a micromixer 70, positioned about the fuel, nozzles 58 and within, a head end plenum 72 of the combustor 25 upstream of the combustion zone 60, as is shown. The micromixer 70 includes a number of micromixer tubes 74 positioned about one or more fuel tubes 76. The micromixer tubes 74 generally may have substantially uniform diameters and may be arranged in annular, concentric rows. Any number of the micromixer tubes 74 and the fuel tubes 76 may be used herein in any size, shape, or configuration. The fuel tubes 76 may be in fluid communication with the fuel source that generates the flow of fuel 30 and may be configured to deliver a small portion of the flow of fuel 30 into each of the micromixer tubes 74.

During operation of the combustor 25, the flow of air 20 from the compressor 15 may be directed through the flow path 68 and into the head end plenum 72 of the combustor 25. Each of the fuel nozzles 58 may direct a portion of the flow of air 20, a portion, of the flow of fuel 30, and optional, flows of other fluids into the combustion, zone 60 for mixing and combustion therein. Meanwhile, each of the micromixer tubes 74 may receive a small portion of the flow of air 20 from the flow path 68 and a small portion of the flow of fuel 30 from the fuel tube 76 for mixing within the micromixer tube 74. The mixed fuel-air flows pass from the micromixer 70 into the combustion zone 60 for combustion therein. The resulting flow of combustion gases 35 are then directed through the transition piece 64 and into the turbine 40 so as to produce useful work therein. Any number of the combustors 25 may be used in a can-annular array or other configurations. Moreover, the combustor 25 described and shown herein is for the purpose of example only, and combustors including other components also may be used.

Figure 3:
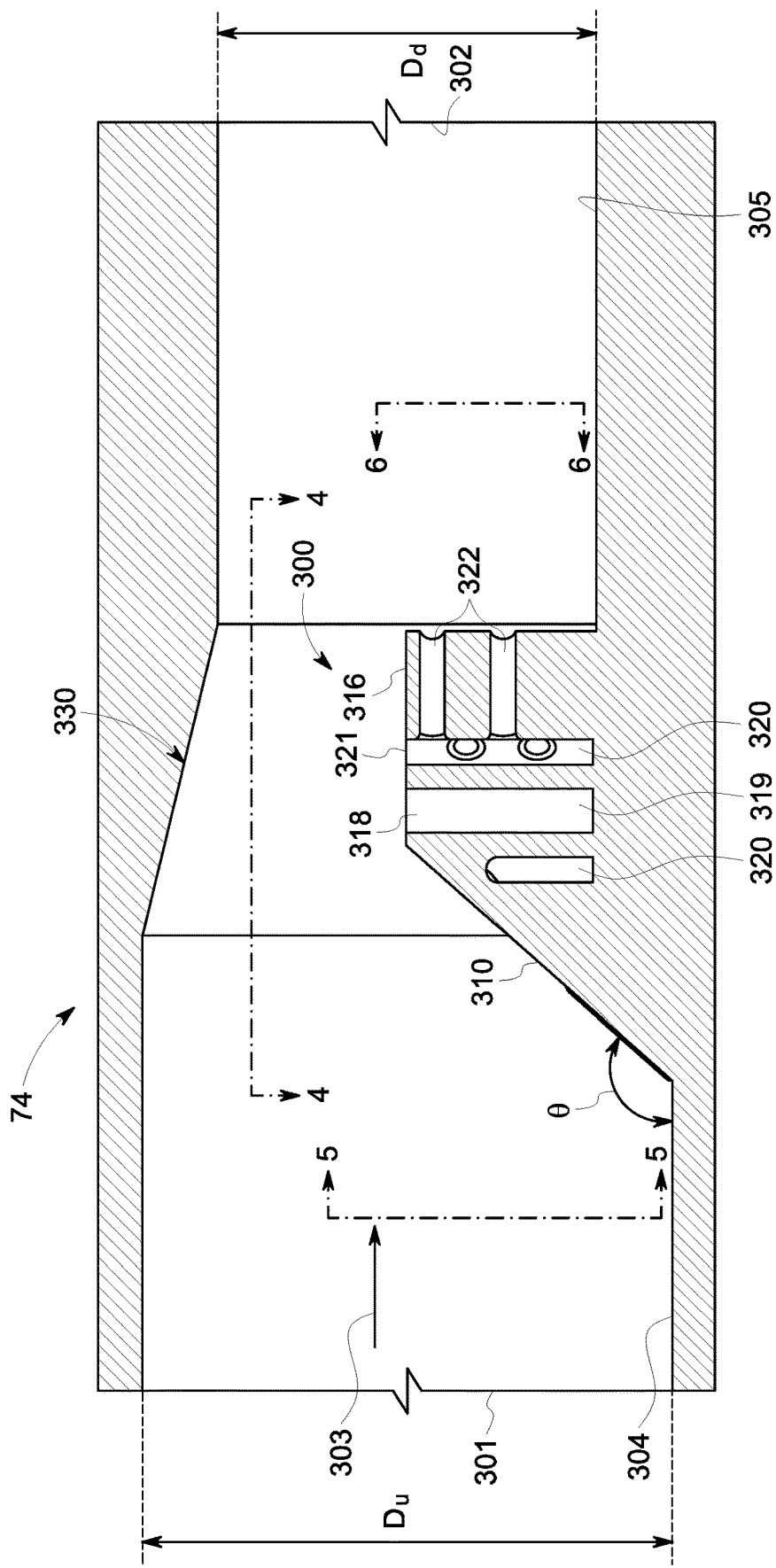
FIG. 3 illustrates a cross-sectional view of a micromixer tube having a liquid fuel injector, according to an aspect of the present disclosure.
Figure 4:
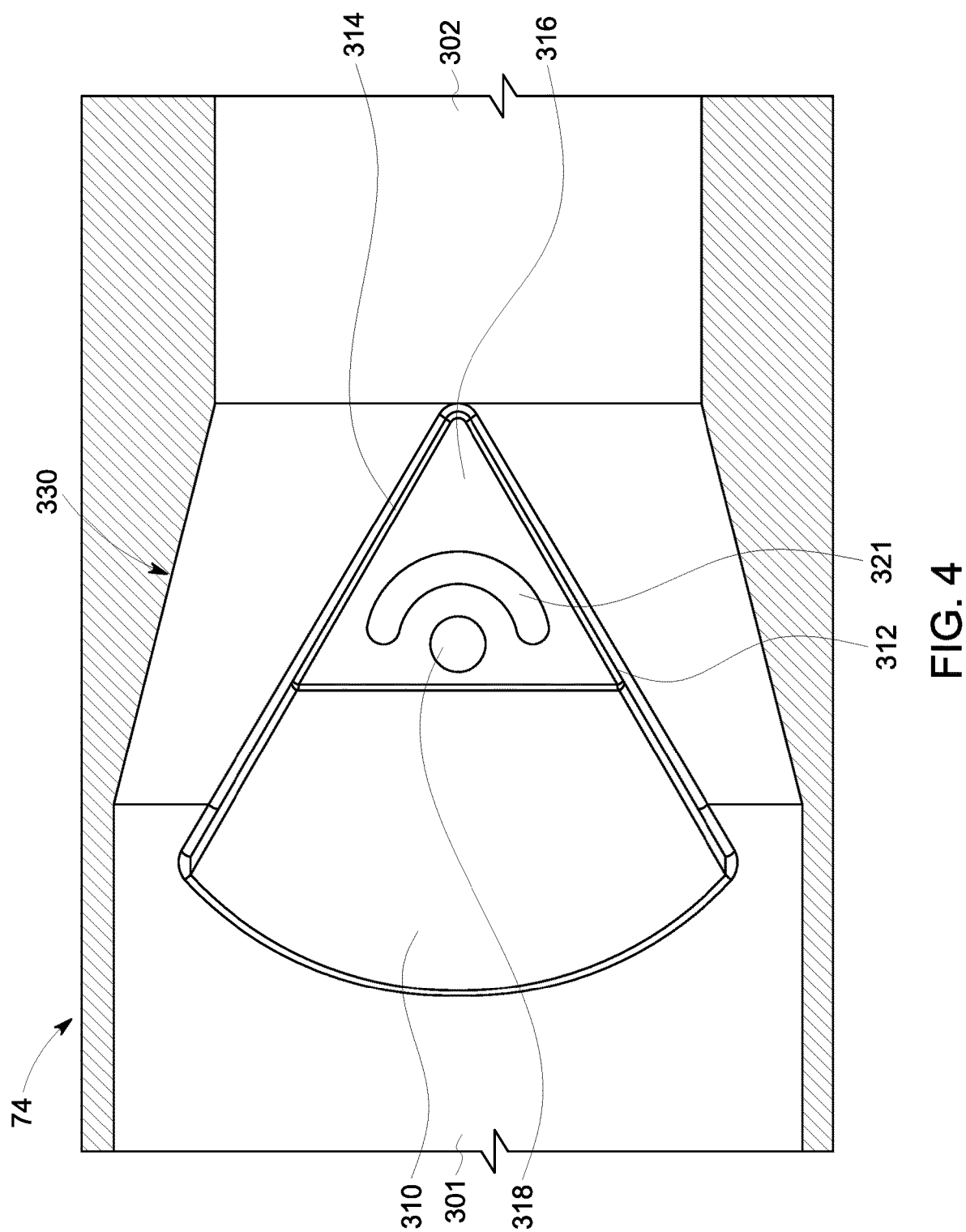
FIG. 4 illustrates a top view of the liquid fuel injector along section line 4-4 of FIG. 3, according to an aspect of the present disclosure.

FIG. 3 illustrates a cross-sectional view of a micromixer tube 74 having a liquid fuel injector 300, according to an aspect of the present disclosure. FIG. 4 illustrates a top view of the liquid fuel injector 300 along section line 4-4 of FIG. 3, according to an aspect of the present disclosure. The micromixer tube 74 is one of many tubes in micromixer 70. The tube 74 has an inlet 301 for receiving a flow 303 and an outlet 302 for dispersing the flow 303 into the combustion zone 60 of the combustor 25. Some or all of the tubes 74 may have a liquid fuel injector 300. The liquid fuel injector 300 projects into the tube 74, and has a ramped upstream surface 310 and two converging side surfaces 312, 314. The ramped upstream surface 310 compresses the flow passing thereover. The ramped upstream surface 310 forms an angle θ of about 120 degrees to about 150 degrees from an inner wall of the upstream portion 304 of the tube to the surface 310. A top surface 316 of the liquid fuel injector 300 includes a liquid fuel outlet 318.

The tube 74 has a nozzle section 330 located between an upstream portion 304 of the tube and a downstream portion 305 of the tube. The upstream portion 304 of the tube has a larger internal diameter $D_u$ than the internal diameter $D_d$ of the downstream portion 305 of the tube, and the nozzle section 330 transitions between the larger diameter $D_u$ and the smaller diameter $D_d$. The liquid fuel injector 300 is located at least partially in the nozzle section 330 (as shown), or the injector 300 may be located entirely within nozzle section 300. The ramped upstream surface 310 may be located in both the upstream portion 304 and the nozzle section 300 (as shown). The ramped upstream portion 310 and the nozzle section 330 both increase the velocity of the flow 303 and this will facilitate proper mixing of the liquid fuel exiting liquid fuel outlet 318 with airflow 303.

The liquid fuel injector 300 has a fuel conduit 319 surrounded at least partially by a cooling conduit 320, and the liquid fuel outlet 318 is an outlet or exit of the fuel conduit 319. Liquid fuel is supplied to and transported through fuel conduit 319. Examples of liquid fuels are gasoline, diesel fuel and jet fuel. The fuel conduit 319 projects substantially radially inward into the tube one of the tube 74. The radial direction in FIG. 3 is up, down or into or out of the page, and is radial with respect to the tube 74. The axial direction in FIG. 3 is left or right, or along an axial axis of tube 74. As one example only, the fuel conduit is angled by about 90 degrees from the interior wall of portions 304, 305, as viewed in FIG. 3. The cooling conduit 320 has a cooling outlet 321 located in the top surface 316, and the cooling outlet 321 may be formed in an arcuate shape, as shown in FIG. 4. The cooling conduit 320 at least partially surrounds the fuel conduit 319, so that the liquid fuel is cooled during operation of the combustor and to prevent the liquid fuel from coking. The cooling conduit 320 is formed on all sides of the fuel conduit 319 until the conduit 319 approaches outlet 318. At the outlet 318 the cooling conduit transitions to an outlet 321 with an arcuate shape that is axially even with and/or downstream of the fuel outlet 318 (as shown in FIG. 4). The cooling flow exiting out of outlet 321 will facilitate dispersion of the liquid fuel, and will help to keep the liquid fuel off of top surface 316.

Figure 5:
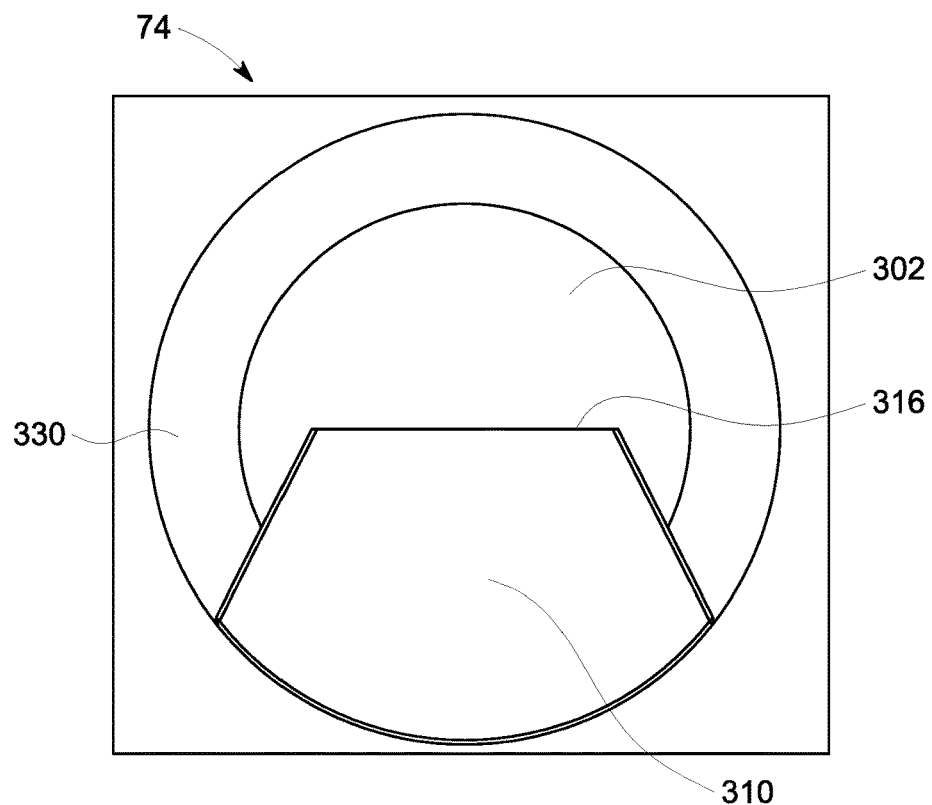
FIG. 5 illustrates a front or upstream view of the liquid fuel injector along section line 5-5 in FIG. 3, according to an aspect of the present disclosure.
Figure 6:
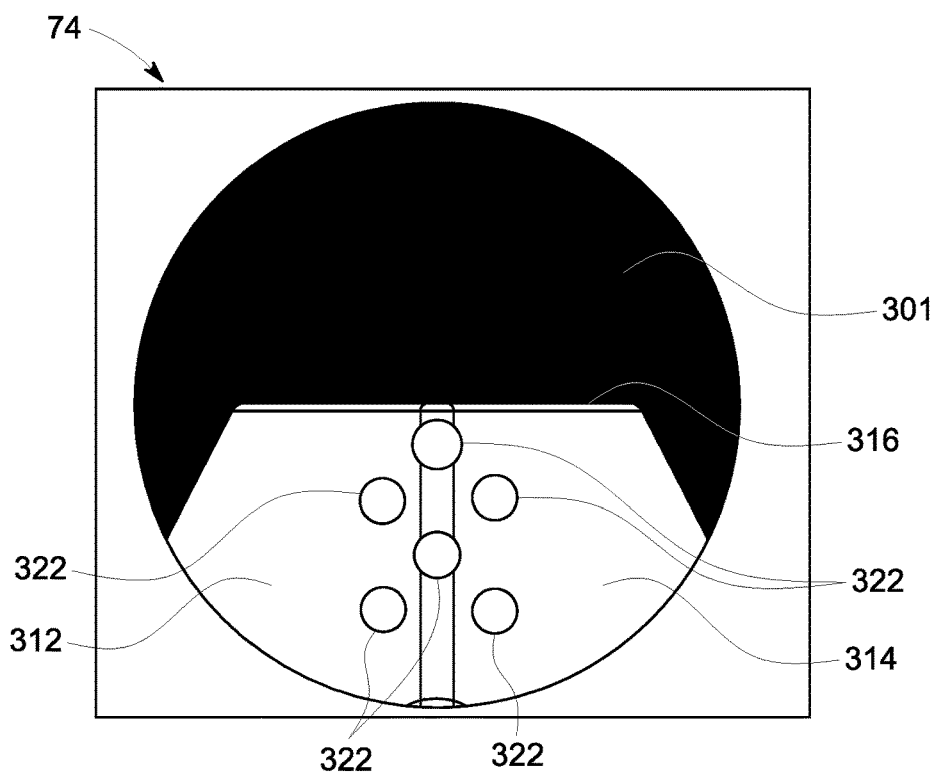
FIG. 6 illustrates a rear or downstream view of the liquid fuel injector along section line 6-6 in FIG. 3, according to an aspect of the present disclosure.

FIG. 5 illustrates a front or upstream view of the liquid fuel injector 300, according to an aspect of the present disclosure. FIG. 6 illustrates a rear or downstream view of the liquid fuel injector 300, according to an aspect of the present disclosure. The cooling conduit 320 also includes a plurality of cooling outlets 322 located on the two converging side surfaces 312, 324. The cooling outlets 322 are configured to extend axially along one of the tubes 74, and are substantially perpendicular to a radial direction with respect to the tube. The axially projecting cooling flow coming out of outlets 322 facilitates entrainment or mixing of the liquid fuel and air flow.

Figure 7:
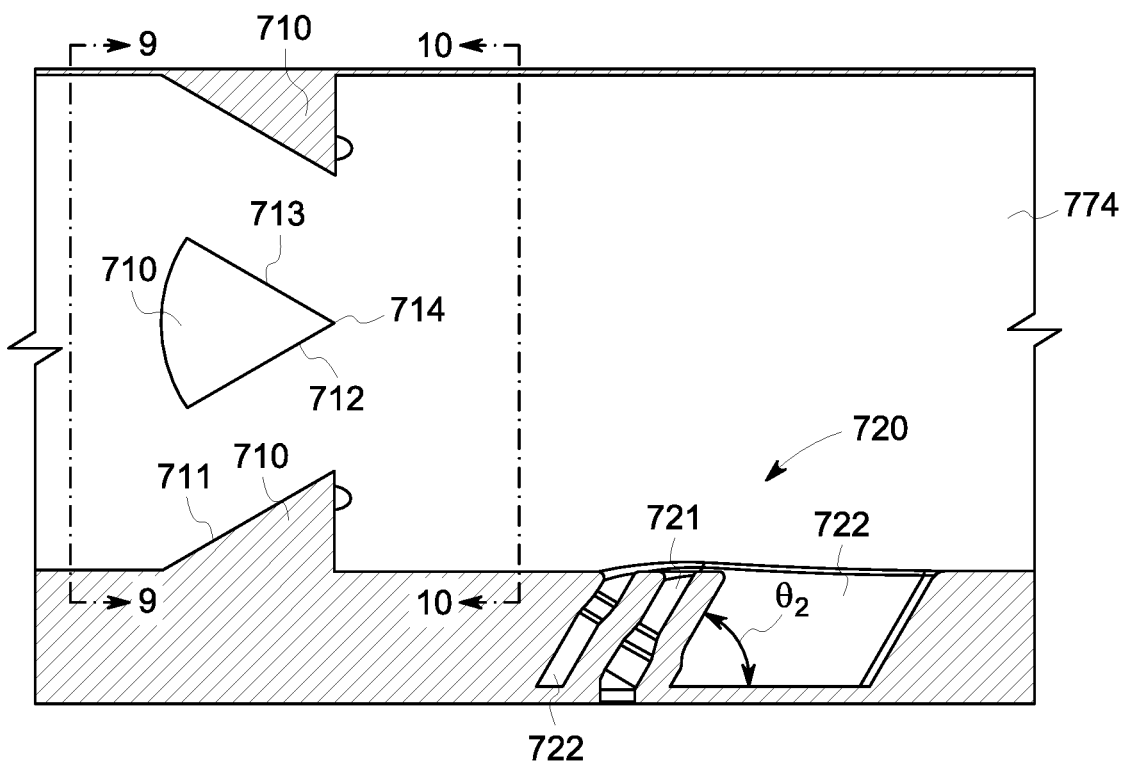
FIG. 7 illustrates a cross-sectional view of a micromixer tube having turbulators, according to an aspect of the present disclosure.
Figure 8:
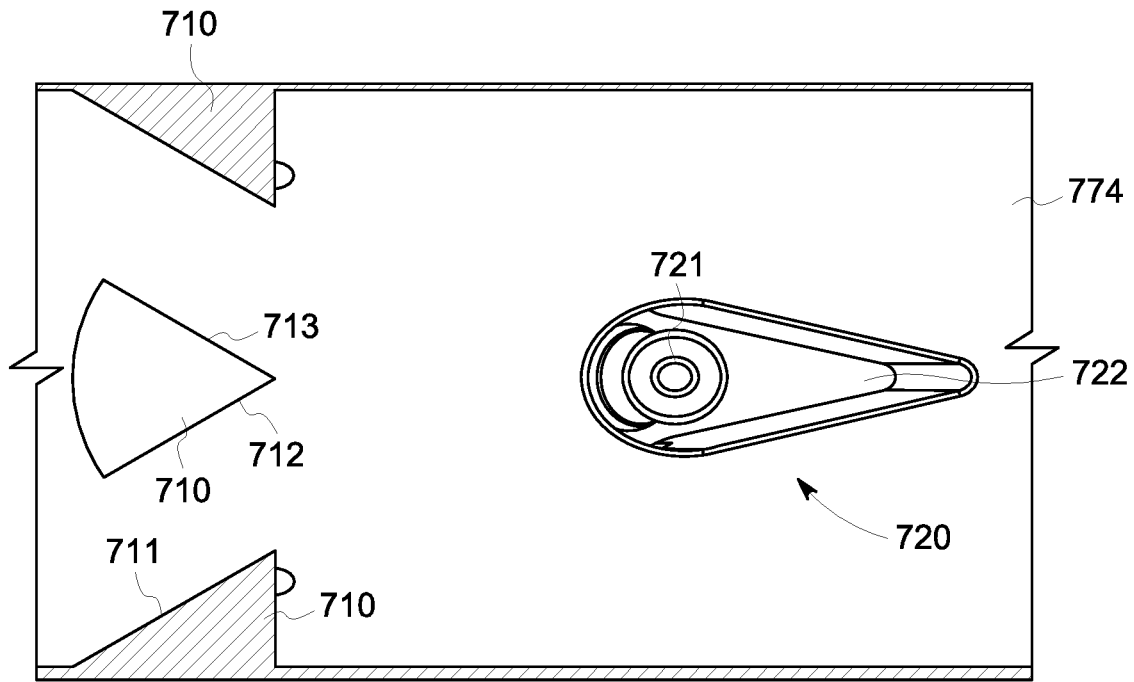
FIG. 8 illustrates a cross-sectional view of a micromixer tube having turbulators, which is rotated 90 degrees with respect to FIG. 7, according to an aspect of the present disclosure.

FIG. 7 illustrates a cross-sectional view of a micromixer tube having turbulators, according to an aspect of the present disclosure. FIG. 8 illustrates a cross-sectional view of a micromixer tube having turbulators, which is rotated 90 degrees with respect to FIG. 7, according to an aspect of the present disclosure. A micromixer tube 774 has a plurality of turbulators 710 and a liquid fuel injector 720. The turbulators 710 are arranged circumferentially around the interior of the tube in substantially the same axial location. In the example shown, four turbulators 710 (of which only three are shown) are spaced ninety degrees from each other. Each turbulator 710 is wedge shaped with a ramped surface 711 or sloping surface facing upstream. The ramped surface 711 tapers to a point 714 as it progresses downstream (left to right in FIGS. 7 and 8), and the sidewalls 712, 713 raise in the radial direction. The downstream facing surface or point 714 is located substantially in an axial plane. The turbulators 710 introduce turbulence or vortices in the air flow and facilitate liquid fuel entrainment. A liquid fuel injector 720 is located downstream of turbulators 710, or the turbulators are located upstream of the liquid fuel injector 720 and liquid fuel outlet 721. A liquid fuel outlet 721 is formed by a conduit that is angled to an axial plane. For example, the liquid fuel outlet's conduit is angled by an angle $\theta_2$ that is about 40 to about 70 degrees, and may be measured from an interior wall of the tube 774 to an outer wall of the liquid fuel outlet's conduit 721. The liquid fuel injector 720 includes a cavity 722, formed in the wall of the tube 774, that surrounds the conduit of the liquid fuel outlet 721. The cavity 722 is supplied with cooling airflow to cool the liquid fuel in the conduit of the liquid fuel outlet 721, to prevent coking of the liquid fuel. The cavity 722 supplies a cooling air flow that cools fuel in the liquid fuel outlet/conduit and enhances fuel/air mixing while reducing fuel entrainment on interior surface of the tube 774. The cavity 722 is teardrop or wedge shaped with a wider upstream portion that tapers to a narrow portion as it progresses downstream. The exits of the liquid fuel outlet 721 and cavity 722 are formed flush with an interior wall of the tube 774.

Figure 9:
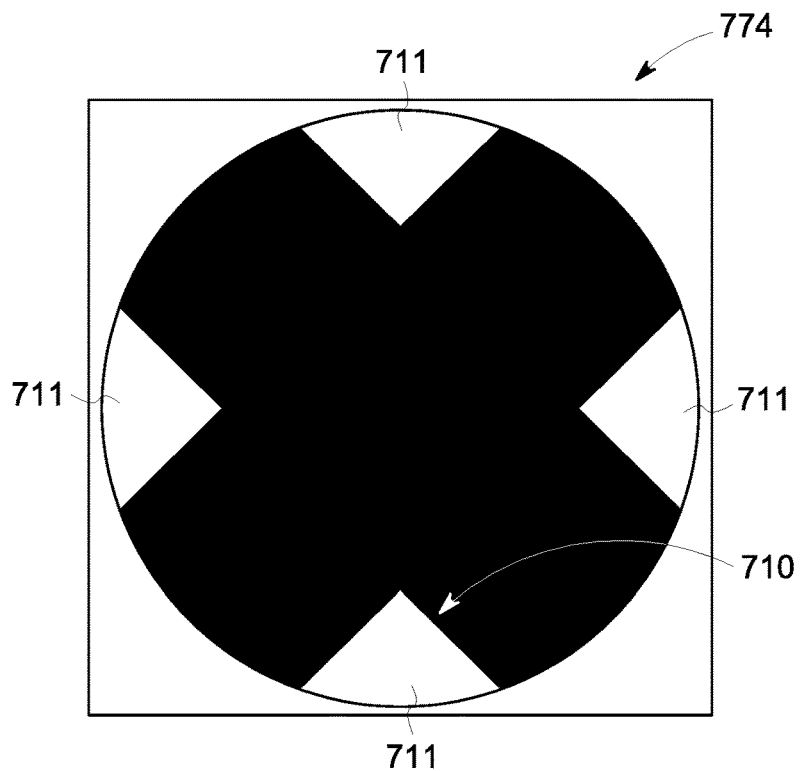
FIG. 9 illustrates a view from an axial plane located upstream of the turbulators along section line 9-9 in FIG. 7, according to an aspect of the present disclosure.
Figure 10:
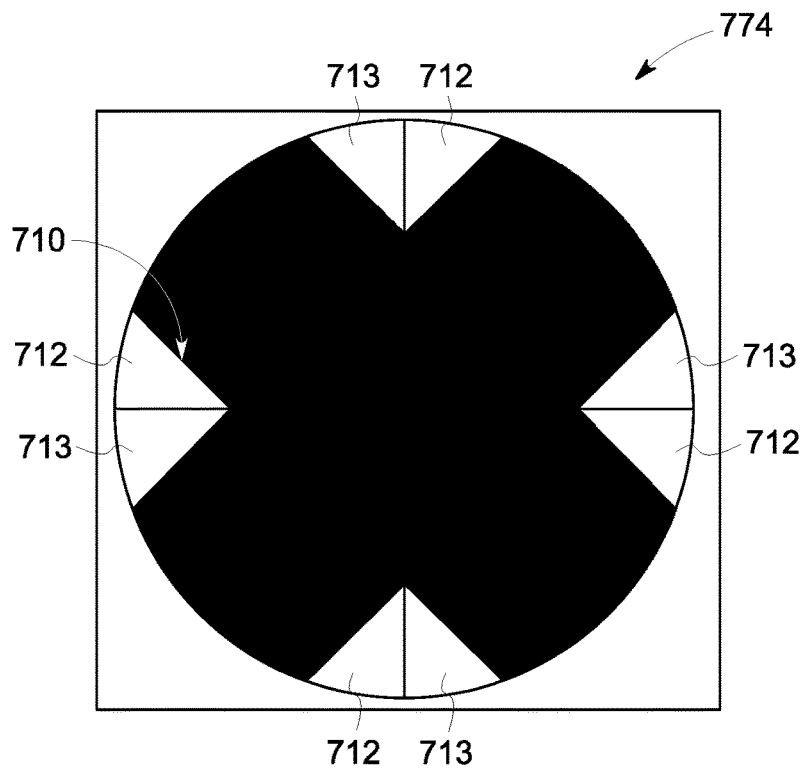
FIG. 10 illustrates a view from an axial plane located downstream of the turbulators along section line 10-10 in FIG. 7, according to an aspect of the present disclosure.

FIG. 9 is a view from an axial plane located upstream of the turbulators 710 along section line 9-9 in FIG. 7, according to an aspect of the present disclosure. FIG. 10 is a view from an axial plane located downstream of the turbulators 710 along section line 10-10 in FIG. 7, according to an aspect of the present disclosure. The ramped surfaces 711 of each of four turbulators 710 are shown spaced at 90 degree intervals around the interior of micromixer tube 774. It is to be understood that 2, 3, 4 or more turbulators 710 may be located inside tube 774 and spaced substantially equally from each other. For example, two turbulators would be spaced 180 degrees apart circumferentially, 3 turbulators would be spaced 120 degrees apart, etc. Each turbulator 710 is also in the same or substantially the same axial location relative to tube 774, and each turbulator is located upstream of liquid fuel injector 720.

Figure 11:
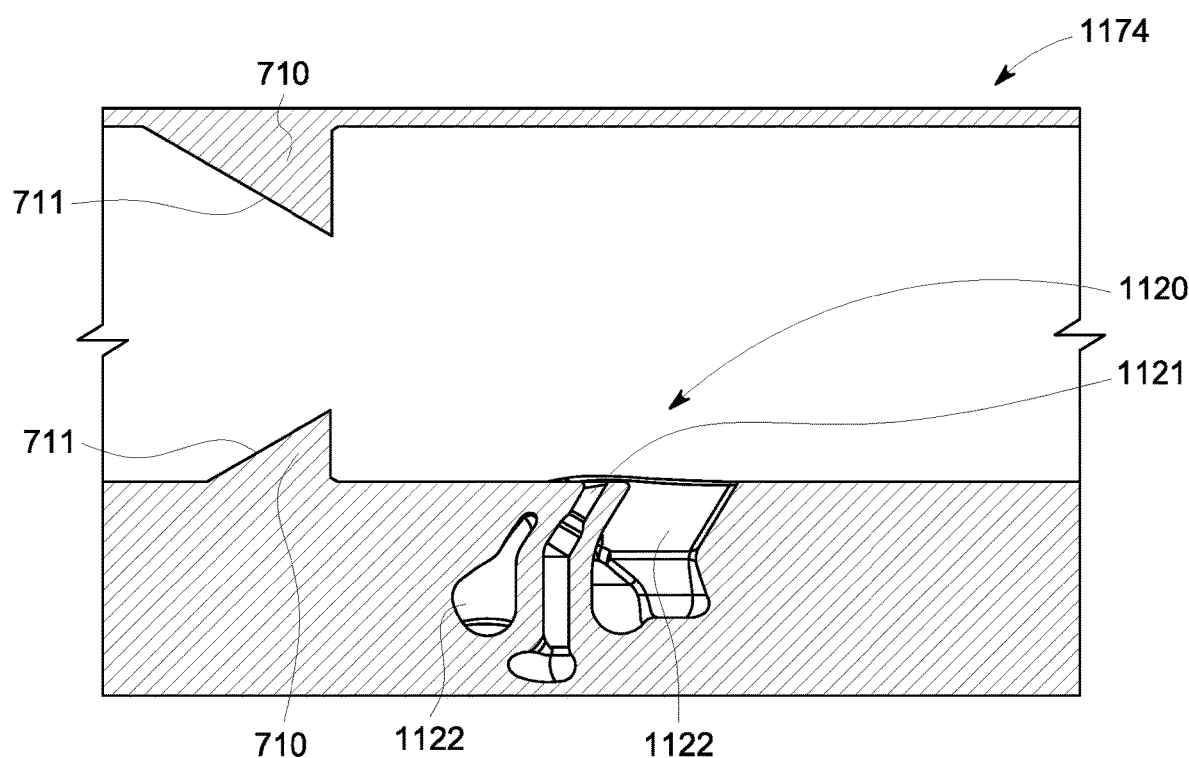
FIG. 11 illustrates a cross-sectional view of a micromixer tube having turbulators, according to an aspect of the present disclosure.
Figure 12:
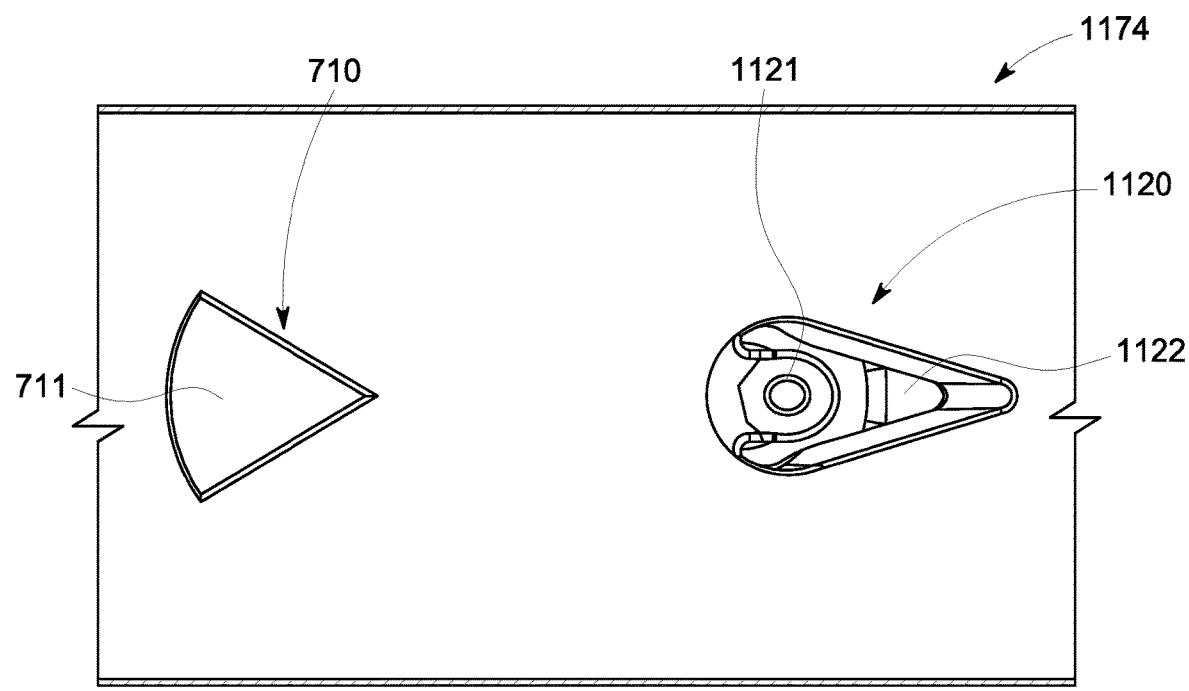
FIG. 12 illustrates a cross-sectional view of a micromixer tube having turbulators, but rotated ninety degrees with respect to FIG. 11, according to an aspect of the present disclosure.

FIG. 11 illustrates a cross-sectional view of a micromixer tube having turbulators, according to an aspect of the present disclosure. FIG. 12 illustrates a cross-sectional view of the same micromixer tube having turbulators, but rotated ninety degrees with respect to FIG. 11, according to an aspect of the present disclosure. Two turbulators 710 are shown located upstream of liquid fuel injector 1120. The turbulators are located in the same axial position, but spaced circumferentially 180 degrees apart from each other. A liquid fuel injector 1120 is located downstream of turbulators 710. A liquid fuel outlet 1121 is formed by a conduit that is angled to an axial plane. For example, the liquid fuel outlet's conduit is angled by an angle that is about 40 to about 70 degrees, and may be measured from an interior wall of the tube to an outer wall of the liquid fuel outlet's conduit. The liquid fuel injector 1120 includes a cavity 1122 formed in the wall of the tube 1174 that surrounds the conduit of the liquid fuel outlet 1121. The cavity 1122 is teardrop or wedge shaped with a wider upstream portion that tapers to a narrow portion as it progresses downstream. The cavity is supplied with cooling airflow to cool the liquid fuel in the conduit of the liquid fuel outlet 1121, to prevent coking of the liquid fuel. The exits of the liquid fuel outlet 1121 and cavity 1122 are formed flush with an interior wall of the tube 1174.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate +/−10% of the stated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A micromixer of a gas turbine, the micromixer comprising:
   a plurality of tubes each having an inlet and an outlet for receiving a flow and dispersing the flow to a combustor;

wherein the combustor comprises a plurality of fuel nozzles positioned at a head end, at least one of the plurality of fuel nozzles includes the micromixer, and at least some of the plurality of tubes having a liquid fuel injector, the liquid fuel injector projecting into at least one of the plurality of tubes, the liquid fuel injector having a ramped upstream surface and two converging side surfaces, the ramped upstream surface compressing the flow passing thereover, and a top surface of the liquid fuel injector comprises a liquid fuel outlet.

2. The micromixer of claim 1, the plurality of tubes having a nozzle section located between an upstream portion of the plurality of tubes and a downstream portion of the plurality of tubes, the upstream portion of the plurality of tubes has a larger internal diameter than the downstream portion of the plurality of tubes, and wherein the liquid fuel injector is located at least partially in the nozzle section.

3. The micromixer of claim 2, wherein the ramped upstream surface is located in both the upstream portion and the nozzle section.

4. The micromixer of claim 1, the liquid fuel injector having a fuel conduit surrounded at least partially by a cooling conduit, the liquid fuel outlet is an outlet of the fuel conduit.

5. The micromixer of claim 4, wherein the fuel conduit projects substantially radially inward into one of the tubes.

6. The micromixer of claim 4, wherein the cooling conduit has a cooling outlet located in the top surface, and the cooling outlet is formed in an arcuate shape, and wherein the cooling outlet is located substantially downstream of the liquid fuel outlet.

7. The micromixer of claim 6, wherein the cooling conduit comprises a plurality of cooling outlets located on the two converging side surfaces.

8. The micromixer of claim 7, wherein the plurality of cooling outlets of the two converging side surfaces are configured to extend axially along at least one of the plurality of tubes, and are substantially perpendicular to a radial direction with respect to the plurality of tubes.

9. The micromixer of claim 1, wherein the ramped upstream surface forms an angle of 120 degrees to 150 degrees from an inner wall of an upstream portion of the plurality of tubes.

10. The micromixer of claim 1, further comprising a plurality of turbulators located upstream of the liquid fuel outlet, each of the plurality of turbulators having a ramped upstream surface and two converging side surfaces.

11. The micromixer of claim 10, further comprising a cavity that surrounds at least a portion of the liquid fuel outlet, the cavity supplying a cooling air flow that cools fuel in the liquid fuel outlet and enhances fuel and/or air mixing while reducing fuel entrainment on an interior surface of the plurality of tubes.

12. A gas turbine having a micromixer, the micromixer comprising:

a plurality of tubes each having an inlet and an outlet for receiving a flow and dispersing the flow to a combustor;

wherein the combustor comprises a plurality of fuel nozzles positioned at a head end, at least one of the plurality of fuel nozzles include the micromixer, and at least some of the plurality of tubes having a liquid fuel injector, the liquid fuel injector projecting into at least one of the plurality of tubes, the liquid fuel injector having a ramped upstream surface and two converging side surfaces, the ramped upstream surface compressing the flow passing thereover, and a top surface of the liquid fuel injector comprises a liquid fuel outlet.

13. The gas turbine of claim 12, the plurality of tubes having a nozzle section located between an upstream portion of the plurality of tubes and a downstream portion of the plurality of tubes, the upstream portion of the plurality of tubes has a larger internal diameter than the downstream portion of the plurality of tubes, and wherein the liquid fuel injector is located at least partially in the nozzle section.

14. The gas turbine of claim 13, wherein the ramped upstream surface is located in both the upstream portion and the nozzle section.

15. The gas turbine of claim 12, the liquid fuel injector having a fuel conduit surrounded at least partially by a cooling conduit, the liquid fuel outlet is an outlet of the fuel conduit.

16. The gas turbine of claim 15, wherein the fuel conduit projects substantially radially inward into at lea one of the plurality of tubes.

17. The gas turbine of claim 15, wherein the cooling conduit has a cooling outlet located in the top surface.

18. The gas turbine of claim 17, wherein the cooling outlet in the top surface is formed in an arcuate shape, and wherein the cooling outlet is located substantially downstream of the liquid fuel outlet.

19. The gas turbine of claim 12, further comprising a plurality of turbulators located upstream of the liquid fuel outlet, each of the plurality of turbulators having a ramped upstream surface and two converging side surfaces.

20. The gas turbine of claim 19, further comprising a cavity that surrounds at least a portion of the liquid fuel outlet, the cavity supplying a cooling air flow that cools fuel in the liquid fuel outlet and enhances fuel and/or air mixing while reducing fuel entrainment on an interior surface of the plurality of tubes.

* * * * *